(12) United States Patent
Li

(10) Patent No.: US 7,188,840 B2
(45) Date of Patent: Mar. 13, 2007

(54) MAGNETIC FLUIDIC SEAL WITH IMPROVED PRESSURE CAPACITY

(76) Inventor: Zhixin Li, 7 Garrison Farm Rd., Hudson, NH (US) 03051

( * ) Notice: Subject to any disclaimer, the term of this patent is extended or adjusted under 35 U.S.C. 154(b) by 92 days.

(21) Appl. No.: 10/614,461

(22) Filed: Jul. 7, 2003

(65) Prior Publication Data

US 2005/0006852 A1    Jan. 13, 2005

(51) Int. Cl.
*F16J 15/43* (2006.01)
(52) U.S. Cl. .................... 277/302; 277/410
(58) Field of Classification Search ......... 277/410, 277/302
See application file for complete search history.

(56) References Cited

U.S. PATENT DOCUMENTS

| | | | |
|---|---|---|---|
| 3,620,584 A | 11/1971 | Rosensweig | |
| 4,526,382 A * | 7/1985 | Raj et al. | 277/410 |
| 4,761,082 A * | 8/1988 | Gabelli | 384/133 |
| 4,890,850 A | 1/1990 | Raj et al. | |
| 4,948,152 A * | 8/1990 | Kilthau et al. | 277/347 |
| 5,057,952 A * | 10/1991 | Takahashi | 360/97.02 |
| 5,267,737 A * | 12/1993 | Cossette et al. | 277/410 |
| 5,560,620 A * | 10/1996 | Black et al. | 277/410 |
| 5,954,342 A | 9/1999 | Mikhalev et al. | |
| 6,543,782 B1 * | 4/2003 | Rosensweig et al. | 277/410 |
| 6,671,125 B1 * | 12/2003 | Sumi | 360/99.08 |
| 6,672,592 B1 * | 1/2004 | Anzai | 277/410 |

FOREIGN PATENT DOCUMENTS

| | | | |
|---|---|---|---|
| EP | 0 182656 A2 * | 5/1986 | |
| JP | 62-278377 | * 12/1987 | |
| JP | 1-220776 | * 9/1989 | |
| JP | 2-212682 | * 8/1990 | |

* cited by examiner

*Primary Examiner*—Alison K. Pickard
(74) *Attorney, Agent, or Firm*—Robert R. DeLeault; Mesmer & DeLeault, PLLC

(57) ABSTRACT

A magnetic assembly for a multistage magnetic fluid rotary seal has a shaft, an annular permanent magnet, at least one pole piece and a radial gap formed between the shaft and the pole piece. The shaft and the pole piece have a plurality of trapezoidal-shaped ridges in opposing, non-contacting relationship forming the radial gap. The trapezoidal-shaped ridges have a flat top portion facing the radial gap and tapered sides that diverge away from the top portion.

19 Claims, 7 Drawing Sheets

MAGNETIC FLUIDIC SEAL WITH IMPROVED PRESSURE CAPACITY

BACKGROUND OF THE INVENTION

1. Field of the Invention

The present invention relates generally to magnetic fluid seals. Particularly, the present invention relates to multistage magnetic fluid seals.

2. Description of the Prior Art

Magnetic fluid rotary seals have been widely used in vacuum applications over the past twenty years. The basic structure of the seal has at least one magnet, a rotary shaft, and pole pieces fastened within a housing. The magnet, the pole pieces and the shaft form a magnetic circuit with air gaps. A magnetic fluid is attracted to the air gap and forms the dynamic sealing between the pole pieces and the rotary shaft. The sealing between stationary parts such as between a pole and the housing is usually accomplished by using a rubber O-ring at the radial interface. Modern applications increasingly require magnetic fluid seals with increased pressure capacities. Conversely, as the size of modern applications decreases, smaller magnetic fluid seals having the same pressure capacity are also needed.

The pressure capacity of a magnetic seal is proportional to the magnetic field within the seal. When the magnetic field is concentrated, or increased, the pressure capacity of the seal also increases proportionally.

Protrusions or ridges, which are also referred to as stages, projections, teeth, or fins, have been incorporated within the gap between a pole piece and a shaft of a magnetic fluid seal to concentrate the magnetic field adjacent the pole piece. These ridges can be formed in the shaft, in the pole, or in both the shaft and the pole. As the number of ridges or teeth increases, the pressure capacity of the seal also increases. However, the sustained differential pressure for each stage is proportional to the total flux of the magnetic field even if two pole pieces are used, one on each side of the magnet. Thus, such a magnetic system has an upper limit and saturation develops at a relatively small number of teeth or ridges. At magnetic saturation, an increase in the number of teeth will reduce the flux choking and will better utilize the magnetic flux.

In situations where magnetic saturation does not exist such as when the magnet is not strong enough or when the pole pieces are increased in size to the limit of the total flux of the magnetic field of the existing magnet, further increases in the number of ridges by increasing the size of the pole piece will result in lesser and lesser increases in pressure capacity. This is so because the magnetic flux field beneath each additional ridge is not strong and centrifugal forces easily throw the magnetic fluid away from the gap.

To further increase the sustained differential pressure, a seal requires multiple magnets and pole pieces. However, it is not always practical to simply increase the size of the magnetic seal. Attempts have been made to increase the sustained pressure capacity for each stage seal below a pole piece of a magnetic seal thereby increasing the pressure capacity of the magnetic seal without increasing the size of the magnetic seal.

U.S. Pat. No. 3,3620,584 (Rosensweig, 1971) discloses several embodiments of a magnetic fluid seal with knife edges cut into the outer ring pole pieces or the shaft, or both. A plurality of knife edges form a row of right triangles where the acute angles of the plurality of knife edges are aligned in one direction. In another embodiment viewed in cross-section, the acute angles of the knife edges are grouped into two groups. The first group of knife edges has the acute angles aligned in one direction and the second group of knife edges has the acute angles aligned in the opposite direction.

U.S. Pat. No. 4,440,402 (Pinkus, 1984) discloses a ferrofin magnetic-fluid seal. The ferrofin magnetic-fluid seal comprises a plurality of concentric, fin-like projections of magnetically permeable material formed on each of a rotating member and a stationary member in a spaced-apart opposing relation defining a plurality of magnetic gap regions. The cross-sectional shape of the fin-like protrusions are rectangular in geometry with parallel sides and a parallel base and top. The dimensions of the fin-like projections are such that the distance between the base and top is greater than the distance between the sides. The fin base is attached to the shaft and the pole pieces. The fin top protrudes into the gap between the shaft and pole pieces.

*Magnetic Fluids, Engineering Applications* (Berkovsky et al., 1993, p. 138–41) discloses that the pressure differential can be increased slightly when tapered teeth (serving as focusing structures of the magnetic field) are located on both the poles and the shaft, one opposite another. The cross-sectional view of the tapered teeth disclosed in Berkovsky et al. form an equilateral triangle where each leg of the triangle is the same length. Berkovsky further discloses that a seal with tapered teeth is disadvantageous since the structure must be fixed in both radial and axial directions. Additionally, Berkovsky discloses that, since working gaps are small (about 0.2 millimeters), problems arise with serviceability of shafts and high shaft runout.

The eccentric location of the shaft and the poles due to high shaft runout causes changes in the working gap in the azimuthal direction, which causes magnetic field intensity changes in the gap between the shaft and the poles. The point at which the gap has increased has a correspondingly decreased magnetic field strength and, thus, a decreased holding capacity of the seal. This decrease may be appreciable. The reduction in sealing capacity due to eccentricity can be more than 80–90%, depending on the level of eccentricity.

U.S. Pat. No. 5,954,342 (Mikhalev, 1999) discloses a magnetic fluid seal apparatus for a rotary shaft. The magnetic shaft sleeve of the apparatus includes a plurality of protrusions affixed thereto. The protrusions are triangularly shaped having an acute angle. The acute angle provides a frictional bond with the magnetic fluid. One group of sleeve protrusions that aligns with one pole has acute angles lined up facing in one direction. The second group of sleeve protrusions that aligns with the second pole has acute angles lined up facing the opposite direction.

Even though the prior art knife edge stages help focus the magnetic flux lines in the air gap and thus slightly increase the differential pressure capacity, they also increase the magnetic choking effect with regard to the density of flux lines at the knife edges, which is limiting. Where double, opposed knife edges are used, misalignment causes a decrease in the magnetic force field.

Therefore, what is needed is a multistage magnetic fluid seal that provides a higher pressure capacity than conventional magnetic fluid seals of similar size. What is also needed is a multistage magnetic fluid seal that focuses the magnetic force field and provides a decreased choking effect. What is further needed is a multistage magnetic fluid seal having stages on both opposed surfaces of the rotary seal that is much less sensitive to axial misalignment than conventional multistage seals having stages on both opposed surfaces of the rotary seal.

SUMMARY OF THE INVENTION

It is an object of the present invention to provide a multistage magnetic fluid seal having an increased pressure capacity. It is another object of the present invention to provide a multistage magnetic fluid seal having a geometric stage design that increases pressure capacity of the seal. It is a further object of the present invention to provide a multistage magnetic fluid seal having a geometric stage design that is less sensitive to axial misalignment than conventional multistage seals.

The present invention achieves these and other objectives by providing a multistage magnetic fluid seal having a rotary shaft, a ring-like magnetic assembly disposed around the rotary shaft forming air gaps, and ferrofluid disposed within the air gaps. The magnetic assembly has a first pole piece, a second pole piece and a permanent magnet between the first pole piece and the second pole piece. The first and second pole pieces are magnetically permeable as is the rotary shaft. The rotary shaft is typically supported by high precision, lubricated bearings. A small radial gap or annulus is created between the rotary shaft and the first and second pole pieces.

In the multistage rotary seal of the present invention, the rotary shaft includes a plurality of ring-like grooves creating a plurality of ring like ridges. The plurality of ring-like ridges have a trapezoidal shape where the top of each ridge has a flat, plateau shape with sides that diverge away from the top to the bottom of the adjacent troughs. At least one of the pole pieces has a plurality of ring-like grooves creating a plurality of ring-like ridges. The pole piece ridges also have a trapezoidal shape. The plurality of shaft ring-like ridges are aligned to coincide with and be concentric with the plurality of pole piece ring-like ridges. Each opposed pair of the plurality of ring-like ridges forms a single stage of the multi-stage seal. The permanent magnet provides the magnetic field in the gap between the plurality of shaft ring-like ridges and the first and second pole pieces. The magnetic field is distributed such that there is a very high flux density in the annular volume of each stage of the multi-stage seal. The gap is filled with a ferrofluid. The flux density decreases to near zero a short distance away from each edge of each sealing stage in the multi-stage seal. The strong magnetic field gradients created by this change in flux density forces the ferrofluid back toward the high flux density region when the liquid O-ring created by the ferrofluid is subjected to a differential pressure.

A critical feature of the present invention is the cross-sectional shape of each of the plurality of ridges. The ridges have a trapezoidal shape where the sides or legs of each ridge are tapered. The tapered sides diverge from the top of the ridge towards the base of the ridge.

The trapezoidal-shaped stage solves the problems seen in the prior art, geometrically-shaped stage. Prior art geometrically-shaped stages are either acute triangle stages, equilateral triangle stages or rectangular stages. In each prior art triangle-shaped stage, the pointed tip of the triangular shape focuses the magnetic flux field. However, the pointed tip of the triangle causes choking of the magnetic flux field strength. A prior art rectangular stage, on the other hand, reduces the choking inherent with the pointed triangular stages. A drawback of the rectangular stage is that it does not focus the magnetic flux within the gap as well as the pointed tip of the triangular stages.

The trapezoidal-shaped stage of the present invention provides the benefits of reduced chocking of the rectangular-shaped stage with increased focusing of the magnetic flux field of the triangular-shaped stage. The trapezoidal-shaped stage provides an angled or tapered stage that focus the magnetic field better than the rectangular stage, while simultaneously reducing the effects of triangular stage choking by providing a flat, top portion on the opposing ridges of each stage. The trapezoidal-shaped stage of the present invention provides a multi-stage seal having higher pressure capacity than similar multi-stage seals utilizing rectangular-shaped or triangular-shaped stages.

The advantages of trapezoidal stages over prior art rectangular stages are even more greatly enhanced when seals with high pressure capacity must be designed. When seals with high pressure capacity are designed, stronger magnets are needed and used to generate strong magnetic fields. The stronger the magnet, the stronger and more dense the magnetic flux. At higher magnetic flux densities, the prior art rectangular-shaped stage begins to choke the magnetic flux more easily than the trapezoidal-shaped stage because the rectangular-shaped stage has higher resistance to magnetic flux.

In the preferred embodiment of the present invention, the second pole piece also has a plurality of ring-like ridges around the inside diameter of the second pole piece. The plurality of ring-like ridges of the rotary shaft are also aligned to coincide with and be concentric with the plurality of ring-like ridges of the second pole piece. Each pair of the plurality of opposed ring-like ridges forms a single stage of a multi-stage seal. The permanent magnet provides the magnetic field in the gap.

In this embodiment of the present invention, each of the plurality of opposed ring-like ridges of the second pole piece has the trapezoidal shape. Like the previous embodiment, the double, opposed trapezoidal-shaped stage increases the pressure capacity of the stage even greater than the single trapezoidal-shaped stage. These increases are both significant and unexpected. In addition, the double trapezoidal-shaped stage also maintains a greater pressure capacity over a larger amount of stage offset, i.e. misalignment, compared to a similar triangular-shaped double stage. This is very important in applications where double, opposed stages are used as stage offset occurs because various machining tolerances and assembling operations are involved.

DETAILED DESCRIPTION OF THE PREFERRED EMBODIMENT

Figure 1:
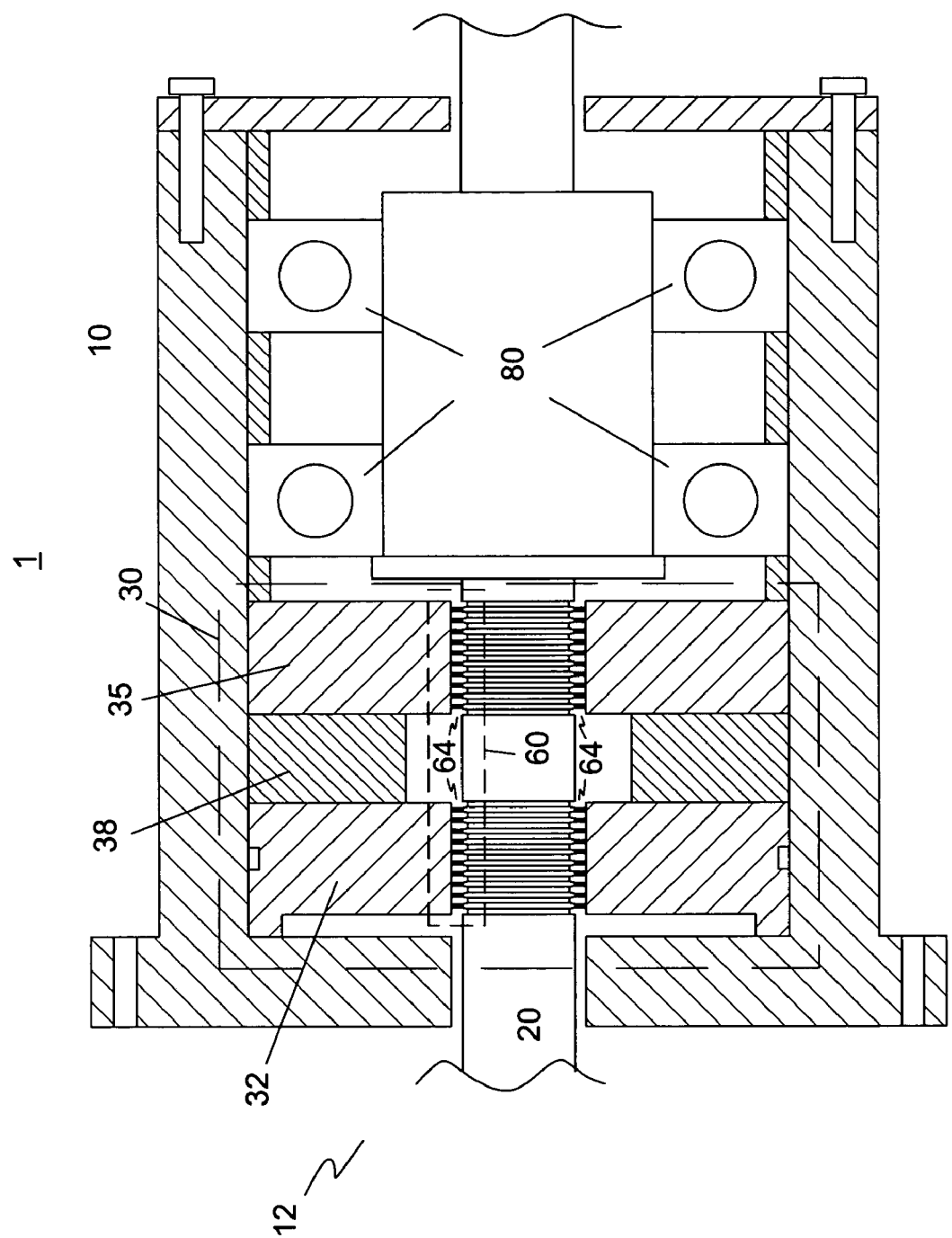
FIG. 1 is a cross-sectional side view of a vacuum rotary ferrofluid seal incorporating the present invention.

The preferred embodiment of the present invention is illustrated in FIGS. 1–3 and 6. FIG. 1 shows one embodiment of the present invention incorporated into a vacuum rotary seal 1. A rotary seal housing 10 supports a rotary shaft 20 that is inserted into a vacuum chamber 12. Rotary seal housing 10 is nonmagnetic and includes a ring-like magnetic assembly 30. Magnetic assembly 30 is adapted to have a multi-stage seal 60 between rotary seal housing 10 and the rotary shaft 20. Magnetic assembly 30 includes a first pole piece 32, a second pole piece 35 and a permanent magnet 38 between first pole piece 32 and second pole piece 35. First pole piece 32 and second pole piece 35 are magnetically permeable as is the rotary shaft 20. Rotary shaft 20 is supported by high-precision, lubricated rolling element bearings 80 to maintain concentricity within the inside diameter of magnetic assembly 30. A small radial gap, or annulus, 64 is created between rotary shaft 20 and first pole piece 32 and second pole piece 35. Multi-stage seal 60 incorporates the trapezoidal-shaped stages of the present invention.

Figure 2:
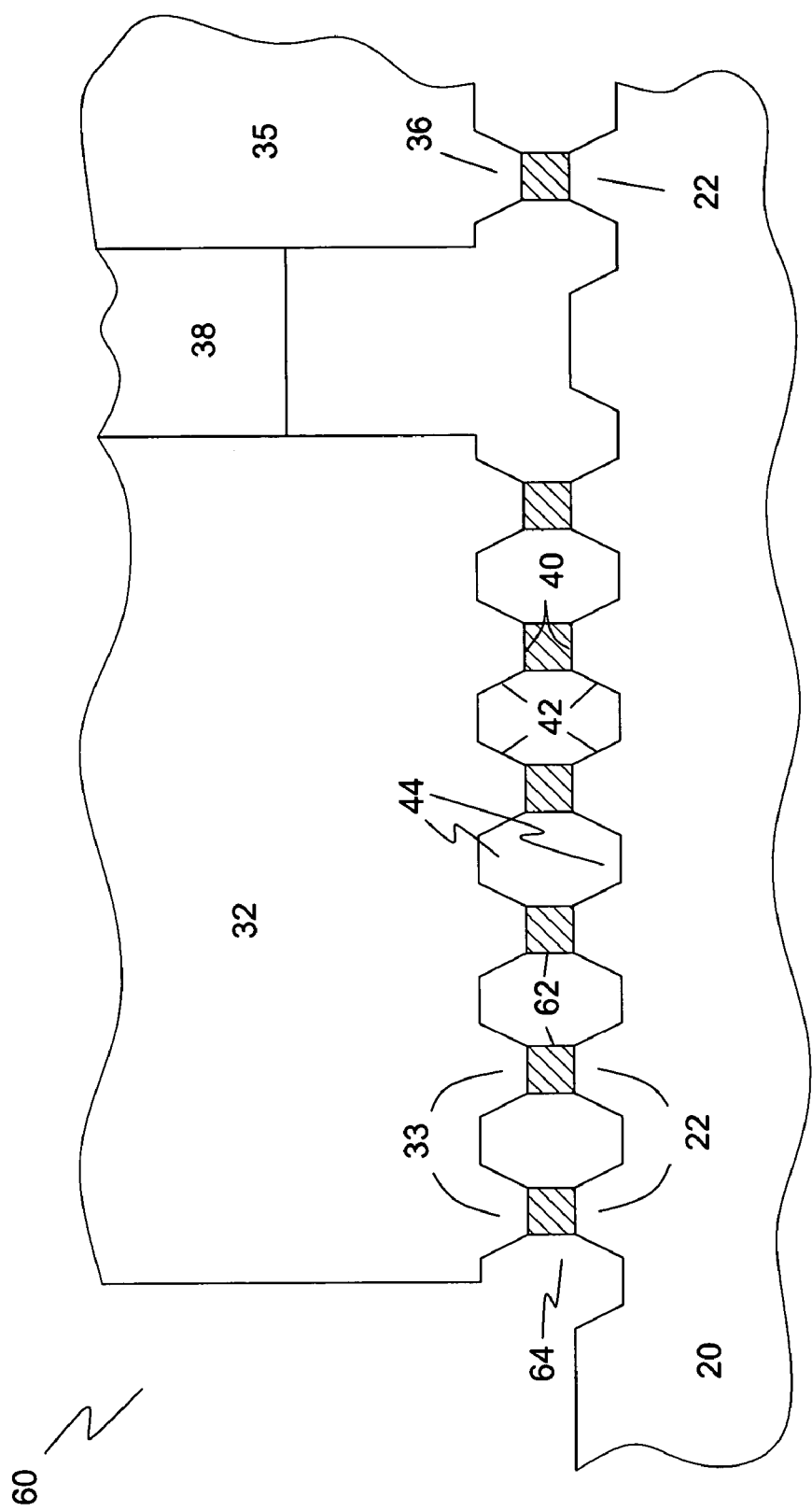
FIG. 2 is an enlarged, cross-sectional view of a portion of the pole pieces and rotary shaft of the present invention showing the trapezoidal-shaped stages formed into the shaft and the pole pieces.

Turning now to FIG. 2 there is illustrated an enlarged cross-sectional side view of multistage seal 60 having six trapezoidal-shaped stage pairs with each of first pole piece 32 and second pole piece 35. A quantity of magnetic fluid 62 is dispersed within the radial gap 64 located between the stages of shaft 20 and pole pieces 32, 35.

A plurality of trapezoidal-shaped stages 22 are formed into shaft 20. Pole pieces 32 and 35 have a plurality of trapezoidal-shaped stages 33 and 36, respectively, which oppose the plurality of trapezoidal-shaped stages 22 forming stages with double ridges. Permanent magnet 38 has a much larger inner diameter, which forms a large radial gap between magnet 38 and rotary shaft 20.

Each trapezoidal-shaped stage 22, 33 and 36 has a plateau portion 40 and tapered sides 42 that diverge from each other away from plateau portion 40 toward an annular region 44. Tapered sides 42 are generally of equal length and may diverge over a range of angles so long as plateau portion 40 and sides 42 do not form right angles. Logically, the tapered sides must diverge at an angle between 0° and 180°.

The final shape of each of the plurality of trapezoidal-shape stages is optimized for the pressure capacity needed for a given application for seal 1.

In the tables presented herein, the pressure capacity for each stage was determined using the magnetic field calculating software known as the MAGNETO Two-dimensional Magnetic Field Solver Version 3.1 software available from Integrated Engineering Software, Inc., Winnipeg, Manitoba, Canada. The MAGNETO software employs the Boundary Element Method of calculating boundary value problems using the boundary integral equation formulation.

A variety of variables may be inputted into the MAGNETO software to calculate the magnetic field strength for a given geometric stage design. The variables for a magnetic fluid seal that can be adjusted within the MAGNETO 3.1 software include the stage shape, the stage location, the pole length, the pole outer diameter, the radial gap distance, the eccentricity of the shaft to the magnet and poles, the pole material, the shaft material, the shaft inner and outer diameters, the magnetic fluid, and the magnet material and magnet dimensions.

For the present invention, the width (w) and depth (d) of the trapezoidal-shaped stage is inputted into the MAGNETO 3.1 software. Other variables within the magnetic fluid seal were held constant to compare the unexpected enhanced capacity of the single and dual trapezoidal stages over magnetic fluid seals with prior art rectangular-shaped and triangular-shaped stages. The properties of Ferrotec fluid #VSG 803, available from Ferrotec (USA) Corporation, Nashua, N.H., with a saturation magnetization value of 450 Gauss and a single ring-shaped Neodymium Iron Boron magnet, size 34, was used to compare the values determined in Tables 1–4.

Particularly for Tables 1–4, the following variables were fixed.

| | |
|---|---|
| Pole Material = Stainless Steel | Shaft Material = Stainless Steel |
| Pole Length = 2.01 inch | Shaft OD = 2.002 inch   Tooth Width = 0.01 inch |
| Radial Gap = 0.004 inch | Shaft ID = 0.001 inch   Tooth Depth = 0.025 inch |
| Graph Position = 0.001 inch from Pole | |

Table 1 shows the magnetic field intensity in Oersteds of a magnetic seal incorporating sixteen trapezoidal-shaped stage pairs where eight stage pairs are formed with each pole piece.

TABLE 1

MAGNETIC FIELD AND SEALING CAPACITY
OF DUAL TRAPEZOIDAL STAGE DESIGN

| Stage# | Max Air Gap Hg (Oersted) | Min Air Gap Hg (Oersted) | Average Gap Hg (Oersted) | Ave. Magnetic Fluid Strength (Gauss) | Stage Pressure Capacity (PSI) |
|---|---|---|---|---|---|
| | Pole #1 - Vacuum Outside to Magnet | | | | |
| 1 | 20412 | 5371 | 12891.5 | 435 | 7.65 |
| 2 | 20494 | 6734 | 13614 | 436 | 7.01 |
| 3 | 20472 | 6720 | 13596 | 436 | 7.01 |
| 4 | 20477 | 6705 | 13591 | 436 | 7.02 |
| 5 | 20522 | 6766 | 13644 | 436 | 7.01 |

TABLE 1-continued

MAGNETIC FIELD AND SEALING CAPACITY
OF DUAL TRAPEZOIDAL STAGE DESIGN

| Stage# | Max Air Gap Hg (Oersted) | Min Air Gap Hg (Oersted) | Average Gap Hg (Oersted) | Ave. Magnetic Fluid Strength (Gauss) | Stage Pressure Capacity (PSI) |
|---|---|---|---|---|---|
| 6 | 20527 | 6767 | 13647 | 436 | 7.01 |
| 7 | 20541 | 6780 | 13660.5 | 436 | 7.01 |
| 8 | 20498 | 6776 | 13637 | 436 | 6.99 |
| Ave. Values | 20493 | 6577 | 13535 | — | 7.09 |
| | | | Tot. PSI for Pole #1 | | 56.7 |
| | | Pole #2 - Magnet to Atmospheric Side | | | |
| 9 | 20262 | 5404 | 12833 | 435 | 7.56 |
| 10 | 20412 | 6583 | 13497.5 | 435 | 7.05 |
| 11 | 20402 | 6629 | 13515.5 | 435 | 7.02 |
| 12 | 20453 | 6630 | 13541.5 | 436 | 7.04 |
| 13 | 20446 | 6676 | 13561 | 436 | 7.02 |
| 14 | 20454 | 6685 | 13569.5 | 436 | 7.02 |
| 15 | 20480 | 6701 | 13590.5 | 436 | 7.02 |
| 16 | 20405 | 6727 | 13566 | 436 | 6.97 |
| Ave. Values | 20414 | 6504 | 13459 | — | 7.09 |
| | | | Total PSI for Pole #2 | | 56.7 |
| | | | Total PSI for Seal | | 113.4 |

As disclosed in Table 1, the highest average magnetic field strength of a single stage pair was approximately 20,500 Oersteds. The lowest average magnetic field strength was approximately 6550 Oersteds. The average differential magnetic field strength for each tapered stage pair was 13,500 Oersteds.

The pressure capacity for each trapezoidal stage pair is proportional to the differential magnetic field strength for that stage pair. Accordingly, the average differential magnetic field strength of 13,500 Gauss corresponds to an average stage pressure capacity of 7.09 pounds per square inch for each stage pair. The pressure capacity for each trapezoidal stage pair is summed to increase the overall pressure differential of seal 60 by the total added capacity of the summed pairs of stages. Thus, the placement of sixteen trapezoidal stage pairs within seal 60 provides a total pressure capacity for seal 60 of 113.4 pounds per square inch.

Figure 3:
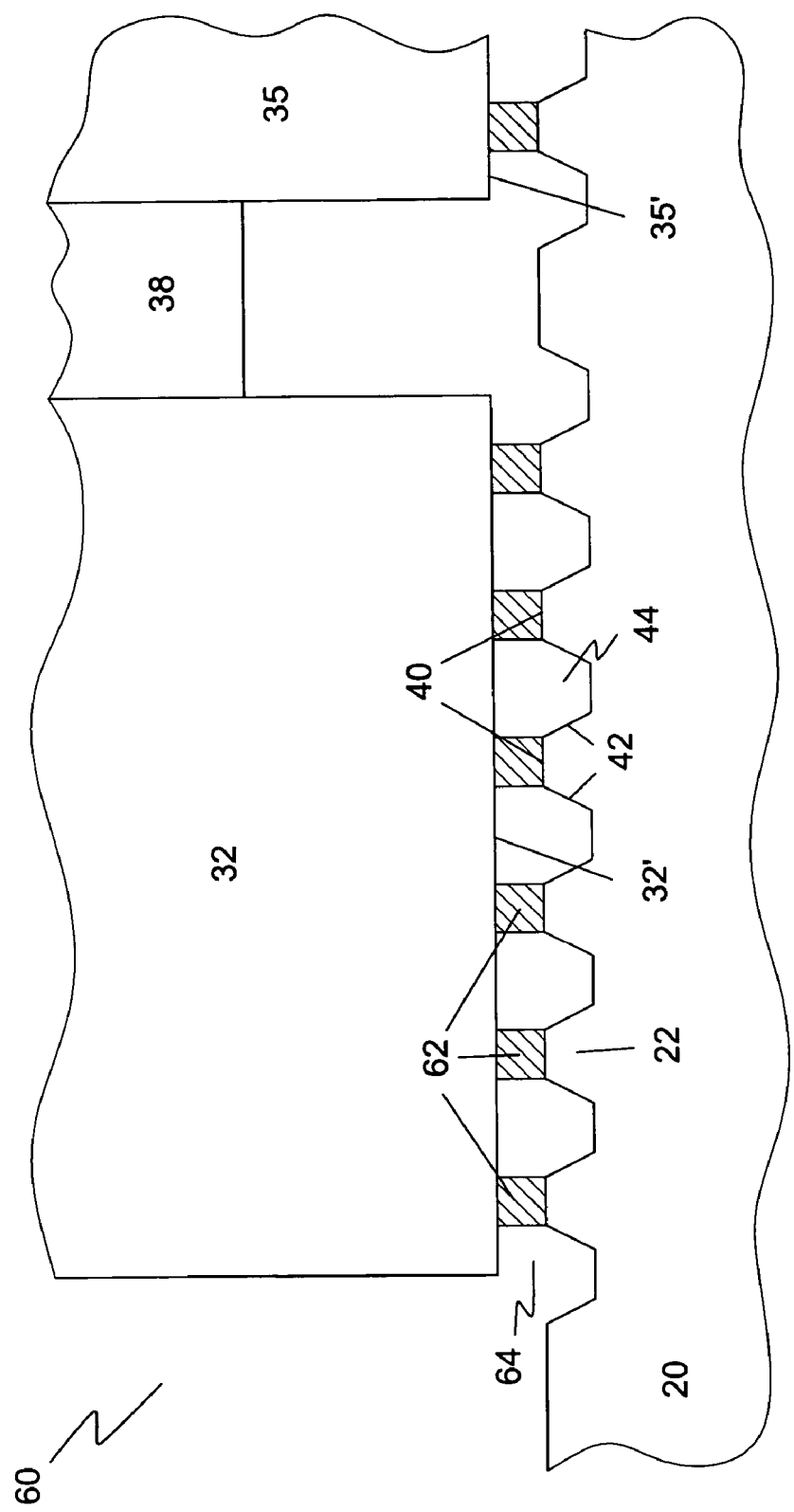
FIG. 3 is an enlarged, cross-sectional view of a portion of the pole pieces and rotary shaft of the present invention showing the trapezoidal-shaped stages formed in the shaft only.

Turning now to FIG. 3 there is illustrated an enlarged cross-sectional side view of a prior art multistage seal 60 having six trapezoidal-shaped stages situated adjacent to first pole piece 32 and second pole piece 35. Only the shaft has the trapezoidal-shaped stages. It is noted that the pole pieces may have the trapezoidal-shaped stages with the shaft having a smooth circumferential surface. A quantity of magnetic fluid 62 is dispersed within the radial gap 64 located between the stages of shaft 20 and the smooth surface 32' and 35' of pole pieces 32, 35, respectively.

A plurality of trapezoidal-shaped stages 22 are formed into shaft 20. Permanent magnet 38 has a much larger inner diameter, which forms a large radial gap between magnet 38 and rotary shaft 20. Each trapezoidal-shaped stage 22 has a shape similar to that disclosed in FIG. 2, which includes a plateau portion 40 and tapered sides 42 that diverge from each other away from plateau portion 40 toward an annular region 44. Tapered sides 42 are generally of equal length and may diverage over a range of angles so long as plateau portion 40 and sides 42 do not form right angles.

To maintain consistency with the data, Table 2 shows the magnetic field intensity in Oersteds of a magnetic seal incorporating sixteen trapezoidal-shaped stages where eight stages are formed with each pole piece and where only the shaft has the trapezoidal-shaped stage.

TABLE 2

MAGNETIC FIELD AND SEALING CAPACITY
OF SINGLE TRAPEZOIDAL STAGE DESIGN

| Stage# | Max Air Gap Hg (Oersted) | Min Air Gap Hg (Oersted) | Average Gap Hg (Oersted) | Average Magnetic Fluid Strength (Gauss) | Stage Pressure Capacity (PSI) |
|---|---|---|---|---|---|
| | Pole #1 - Vacuum Outside to Magnet | | | | |
| 1 | 18368 | 7653 | 13010.5 | 435 | 5.45 |
| 2 | 18615 | 9193 | 13904 | 436 | 4.81 |
| 3 | 18816 | 9453 | 14134.5 | 436 | 4.78 |

TABLE 2-continued

MAGNETIC FIELD AND SEALING CAPACITY
OF SINGLE TRAPEZOIDAL STAGE DESIGN

| Stage# | Max Air Gap Hg (Oersted) | Min Air Gap Hg (Oersted) | Average Gap Hg (Oersted) | Average Magnetic Fluid Strength (Gauss) | Stage Pressure Capacity (PSI) |
|---|---|---|---|---|---|
| 4 | 18681 | 9438 | 14059.5 | 436 | 4.72 |
| 5 | 18576 | 9342 | 13959 | 436 | 4.71 |
| 6 | 18316 | 9251 | 13783.5 | 436 | 4.62 |
| 7 | 18314 | 8983 | 13648.5 | 436 | 4.76 |
| 8 | 18352 | 8933 | 13642.5 | 436 | 4.80 |
| Ave. Values | 18504.8 | 9030.8 | 13767.8 | — | 4.83 |
| | | | Total PSI for Pole #1 | | 38.6 |
| | | Pole #2 Magnet to Atmospheric Side | | | |
| 9 | 18197 | 7181 | 12689 | 435 | 5.60 |
| 10 | 18272 | 8923 | 13597.5 | 436 | 4.76 |
| 11 | 18162 | 8878 | 13520 | 436 | 4.73 |
| 12 | 18482 | 9194 | 13838 | 436 | 4.74 |
| 13 | 18636 | 9347 | 13991.5 | 436 | 4.74 |
| 14 | 18823 | 9450 | 14136.5 | 436 | 4.78 |
| 15 | 18699 | 9492 | 14095.5 | 436 | 4.70 |
| 16 | 18421 | 9253 | 13837 | 436 | 4.67 |
| Ave. Values | 18461.5 | 8964.75 | 13713.1 | — | 4.84 |
| | | | Total PSI for Pole #2 | | 38.7 |
| | | | Total PSI for Seal | | 77.4 |

As disclosed in Table 2, the highest average magnetic field strength of a single trapezoidal stage was approximately 18,500 Oersteds. The lowest average magnetic field strength of a single trapezoidal stage was approximately 9,000 Oersteds. The average differential magnetic field strength for each single trapezoidal stage was 13,700 Oersteds.

The pressure capacity for each single trapezoidal stage, just as for the dual stage pair, is proportional to the differential magnetic field strength for that single stage. Accordingly, the average differential magnetic field strength of 13,700 Oersteds corresponds to an average single stage pressure capacity of 4.835 pounds per square inch for each single trapezoidal stage. The pressure capacity for each single trapezoidal stage is summed to increase the overall pressure differential of seal 60 by the total added capacity of the summed single stages. Thus, the placement of sixteen single trapezoidal stages on shaft 20 of seal 60 provides a total pressure capacity for seal 60 of 77.4 pounds per square inch.

Figure 4:
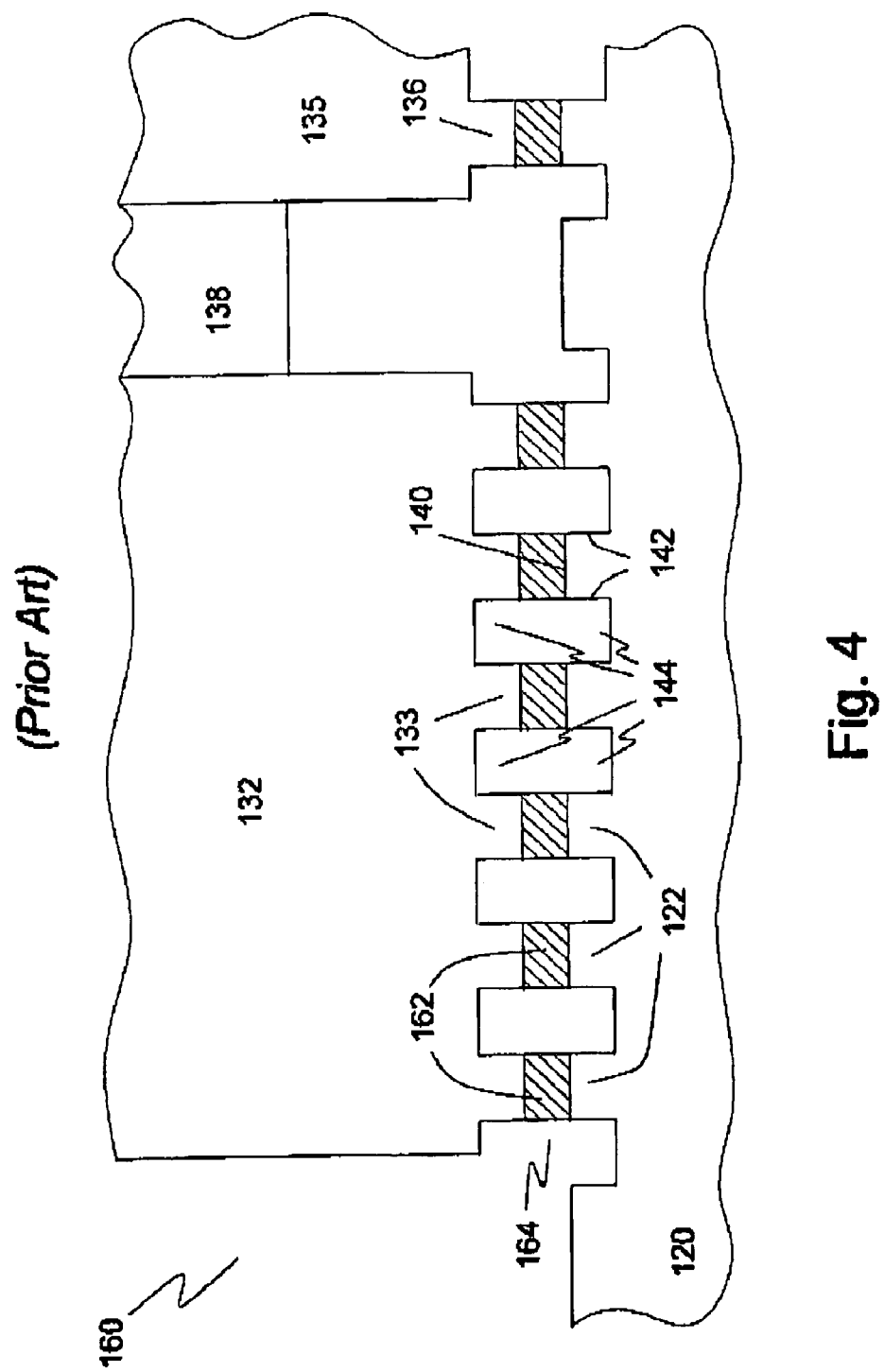
FIG. 4 is an enlarged, cross-sectional view of a portion of the pole pieces and rotary shaft of the prior art showing the rectangular-shaped stages formed into the shaft and the pole pieces.

FIG. 4 illustrates an enlarged cross-sectional side view of a prior art, multistage seal 160 having six rectangular-shaped stage pairs between a shaft 120 and a first pole piece 132 and a second pole piece 135. A quantity of magnetic fluid 162 is dispersed within a radial gap 164 located between the stages of shaft 120 and pole pieces 132, 135. A plurality of rectangular-shaped stages 122 are formed into shaft 120. Pole pieces 132 and 135 have a plurality of rectangular-shaped stages 133 and 136, respectively, which are in an opposed relationship with the plurality of rectangular-shaped stages 122 forming stages with double ridges. Permanent magnet 138 has a much larger inner diameter, which forms a large radial gap between magnet 138 and rotary shaft 120. Each rectangular-shaped stage 122, 133 and 136 has a plateau portion 140 and perpendicular sides 142 that issue away from plateau portion 140 toward an annular region 144. Perpendicular sides 142 are generally of equal length and form right angles with plateau portion 140.

Table 3 shows the magnetic field intensity in Oersteds of a magnetic seal incorporating sixteen rectangular-shaped stage pairs where eight stage pairs are formed with each pole piece.

TABLE 3

MAGNETIC FIELD AND SEALING CAPACITY
OF DUAL RECTANGULAR STAGE DESIGN

| Stage# | Max Air Gap Hg (Oersted) | Min Air Gap Hg (Oersted) | Average Gap Hg (Oersted) | Ave. Magnetic Fluid Field Strength (Gauss) | Stage Pressure Capacity (PSI) |
|---|---|---|---|---|---|
| | Pole #1 - Vacuum Outside to Magnet | | | | |
| 1 | 14208 | 5296 | 9752 | 430 | 4.49 |
| 2 | 14262 | 5702 | 9982 | 431 | 4.31 |
| 3 | 14276 | 5635 | 9955.5 | 431 | 4.35 |

TABLE 3-continued

MAGNETIC FIELD AND SEALING CAPACITY OF DUAL RECTANGULAR STAGE DESIGN

| Stage# | Max Air Gap Hg (Oersted) | Min Air Gap Hg (Oersted) | Average Gap Hg (Oersted) | Ave. Magnetic Fluid Field Strength (Gauss) | Stage Pressure Capacity (PSI) |
|---|---|---|---|---|---|
| 4 | 14306 | 5699 | 10002.5 | 431 | 4.34 |
| 5 | 14372 | 5650 | 10011 | 431 | 4.39 |
| 6 | 14561 | 5611 | 10086 | 431 | 4.51 |
| 7 | 14504 | 5568 | 10036 | 431 | 4.50 |
| 8 | 14075 | 5526 | 9800.5 | 430 | 4.30 |
| Ave. Values | 14320.5 | 5585.9 | 9953.2 | — | 4.40 |
| | | | Total PSI for Pole #1 | | 35.2 |
| | | Pole #2 - Magnet to Atmospheric Side | | | |
| 9 | 14213 | 5321 | 9767 | 430 | 4.48 |
| 10 | 14896 | 5651 | 10273.5 | 431 | 4.66 |
| 11 | 14710 | 5635 | 10172.5 | 431 | 4.58 |
| 12 | 14712 | 5634 | 10173 | 431 | 4.58 |
| 13 | 14462 | 5630 | 10046 | 431 | 4.45 |
| 14 | 14233 | 5602 | 9917.5 | 430 | 4.35 |
| 15 | 14262 | 5675 | 9968.5 | 431 | 4.33 |
| 16 | 14152 | 5659 | 9905.5 | 430 | 4.28 |
| Ave. Values | 14455 | 5600.9 | 10027.9 | — | 4.46 |
| | | | Total PSI for Pole #2 | | 35.7 |
| | | | Total PSI for Seal | | 70.9 |

As disclosed in Table 3, the highest average magnetic field strength of a single stage pair was approximately 14,385 Oersteds. The lowest average magnetic field strength was approximately 5,600 Oersteds. The average differential field strength for each stage was approximately 10,000 Oersteds. The pressure capacity for each rectangular stage pair was approximately 4.43 pounds per square inch. The pressure capacity for each rectangular stage is summed to increase the overall pressure differential of the seal by the total added capacity of the summed stages. In the case of the rectangular stage pairs placed along the shaft and the poles, the pressure capacity of the seal provides a total pressure capacity of approximately 70.9 pounds per square inch.

The pressure capacity of 113.4 pounds per square inch for the seal with sixteen trapezoidal stage pairs is 1.6 times higher than the pressure capacity of 70.9 pounds per square inch for the seal having sixteen prior art rectangular stage pairs.

Figure 5:
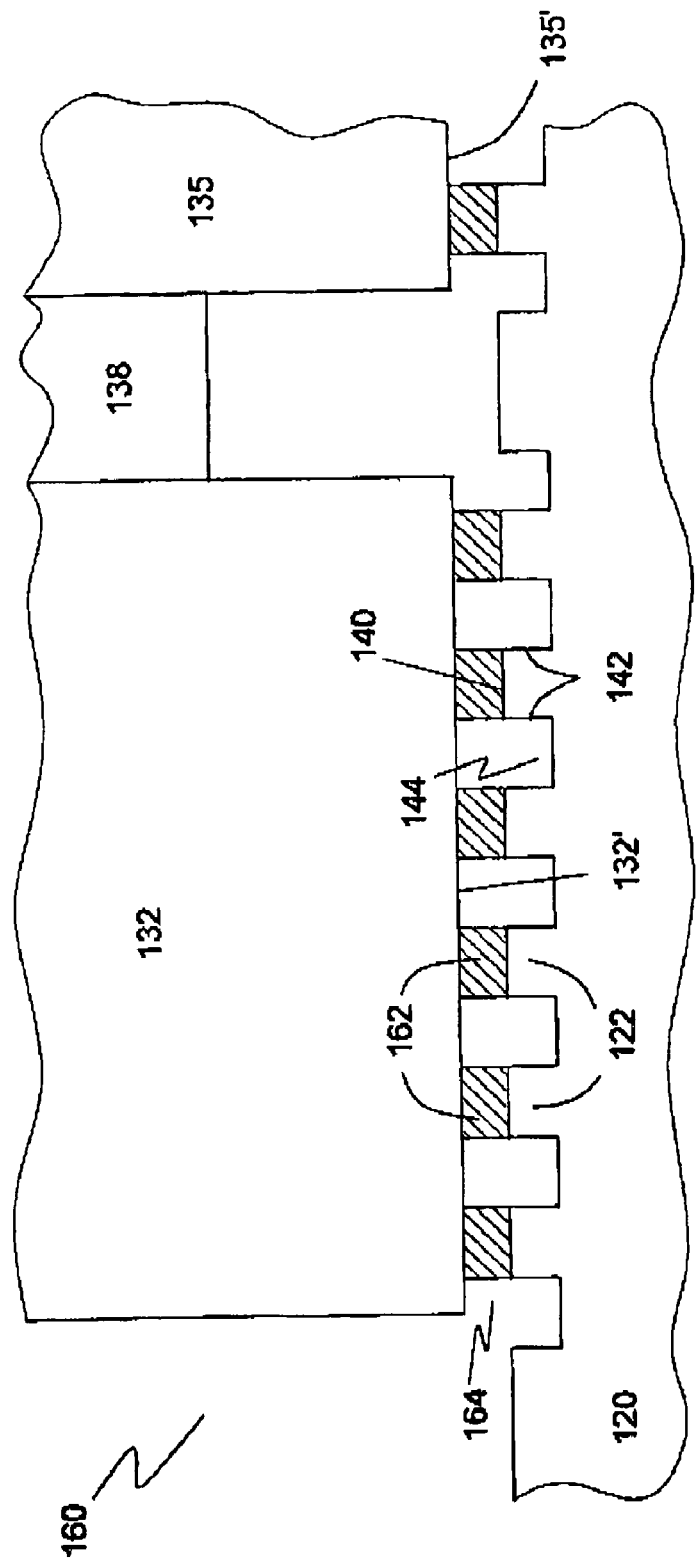
FIG. 5 is an enlarged, cross-sectional view of a portion of the pole pieces and rotary shaft of the prior art showing the rectangular-shaped stages formed in the shaft only.

Turning now to FIG. 5, there is illustrated an enlarged, cross-sectional side view of multistage seal 160 having six rectangular-shaped stages situated adjacent to first pole piece 132 and second pole piece 135. A quantity of magnetic fluid 162 is dispersed within the radial gap 164 located between the stages of shaft 120 and the smooth surface 132' and 135' of pole pieces 132, 135, respectively.

A plurality of rectangular-shaped stages 122 are formed into shaft 120. Permanent magnet 138 has a much larger inner diameter, which forms a large radial gap between magnet 138 and rotary shaft 120. Each rectangular-shaped stage 122 has a shape similar to that disclosed in FIG. 4, which includes a plateau portion 140 and perpendicular sides 142 that issue away from plateau portion 140 toward an annular region 144. Perpendicular sides 142 are generally of equal length and form right angles with plateau portion 140.

Table 4 shows the magnetic field intensity in Oersteds of a magnetic seal incorporating sixteen rectangular-shaped stages where eight stages are formed with each pole piece and only the shaft has the rectangular-shaped stage.

TABLE 4

MAGNETIC FIELD AND SEALING CAPACITY OF SINGLE RECTANGULAR STAGE DESIGN

| Stage # | Max Air Gap Hg (Oersted) | Min Air Gap Hg (Oersted) | Average Gap Hg (Oersted) | Ave. Magnetic Fluid Field Strength (Gauss) | Stage Pressure Capacity (PSI) |
|---|---|---|---|---|---|
| | | Pole #1 - Vacuum Outside Inward to Magnet | | | |
| 1 | 15235 | 8583 | 11909 | 434 | 3.37 |
| 2 | 15250 | 8441 | 11845.5 | 434 | 3.45 |
| 3 | 15242 | 8322 | 11782 | 433 | 3.51 |
| 4 | 15240 | 8395 | 11817.5 | 433 | 3.47 |
| 5 | 15228 | 8343 | 11785.5 | 433 | 3.49 |

TABLE 4-continued

MAGNETIC FIELD AND SEALING CAPACITY
OF SINGLE RECTANGULAR STAGE DESIGN

| Stage # | Max Air Gap Hg (Oersted) | Min Air Gap Hg (Oersted) | Average Gap Hg (Oersted) | Ave. Magnetic Fluid Strength (Gauss) | Stage Pressure Capacity (PSI) |
|---|---|---|---|---|---|
| 6 | 15162 | 8321 | 11741.5 | 433 | 3.47 |
| 7 | 15092 | 8284 | 11688 | 433 | 3.45 |
| 8 | 15116 | 8279 | 11697.5 | 433 | 3.47 |
| Ave. Values | 15196 | 8371 | 11783 | — | 3.46 |
| | | | Total PSI for Pole #1 | | 27.7 |
| | | Pole #2 - Magnet to Atmospheric Side | | | |
| 9 | 15313 | 8424 | 11868.5 | 434 | 3.49 |
| 10 | 15263 | 8448 | 11855.5 | 434 | 3.46 |
| 11 | 15273 | 8405 | 11839 | 434 | 3.48 |
| 12 | 15221 | 8380 | 11800.5 | 433 | 3.47 |
| 13 | 15190 | 8321 | 11755.5 | 433 | 3.48 |
| 14 | 15200 | 8297 | 11748.5 | 433 | 3.50 |
| 15 | 15154 | 8317 | 11735.5 | 433 | 3.47 |
| 16 | 15117 | 8384 | 11750.5 | 433 | 3.41 |
| Ave. Values | 15216 | 8372 | 11794 | — | 3.47 |
| | | | Total PSI for Pole #2 | | 27.8 |
| | | | Total PSI for Seal | | 55.5 |

As disclosed in Table 4, the highest average magnetic field strength of a single rectangular stage was approximately 15,200 Oersteds. The lowest average magnetic field strength of a single trapezoidal stage was approximately 8,400 Oersteds. The average differential magnetic field strength for each single rectangular stage was 11,790 Oersteds.

The pressure capacity for each single rectangular stage, just as for the dual stage pair, is proportional to the differential magnetic field strength for that single stage. Accordingly, the average differential magnetic field strength of 11,790 Oersteds corresponds to an average single stage pressure capacity of 3.50 pounds per square inch for each single rectangular stage. The pressure capacity for each single rectangular stage is summed to increase the overall pressure differential of the seal by the total added capacity of the summed single stages. Thus, the placement of sixteen single trapezoidal stages on shaft 120 provides a total pressure capacity of approximately 55.5 pounds per square inch.

The total pressure capacity of a seal with sixteen double trapezoidal stages, as shown in Table 1, is 113.4 pounds per square inch. The total pressure capacity of a seal with sixteen prior art double rectangular stages, as shown in Table 3, is 70.9 pounds per square inch. The increase in total pressure capacity of a seal with sixteen double trapezoidal stages is approximately 1.6 times greater than the seal with prior art double rectangular stages. This increase in stage capacity was quite unexpected.

A comparison was also performed between seals having double trapezoidal-shaped stages and double triangular-shaped stages. The total pressure capacity for these two types of seals was determined for a seal having 20 stages where the stage pairs were radially concentric and axially concentric and where the stage pairs were radially concentric and had an axial offset.

Figure 6:
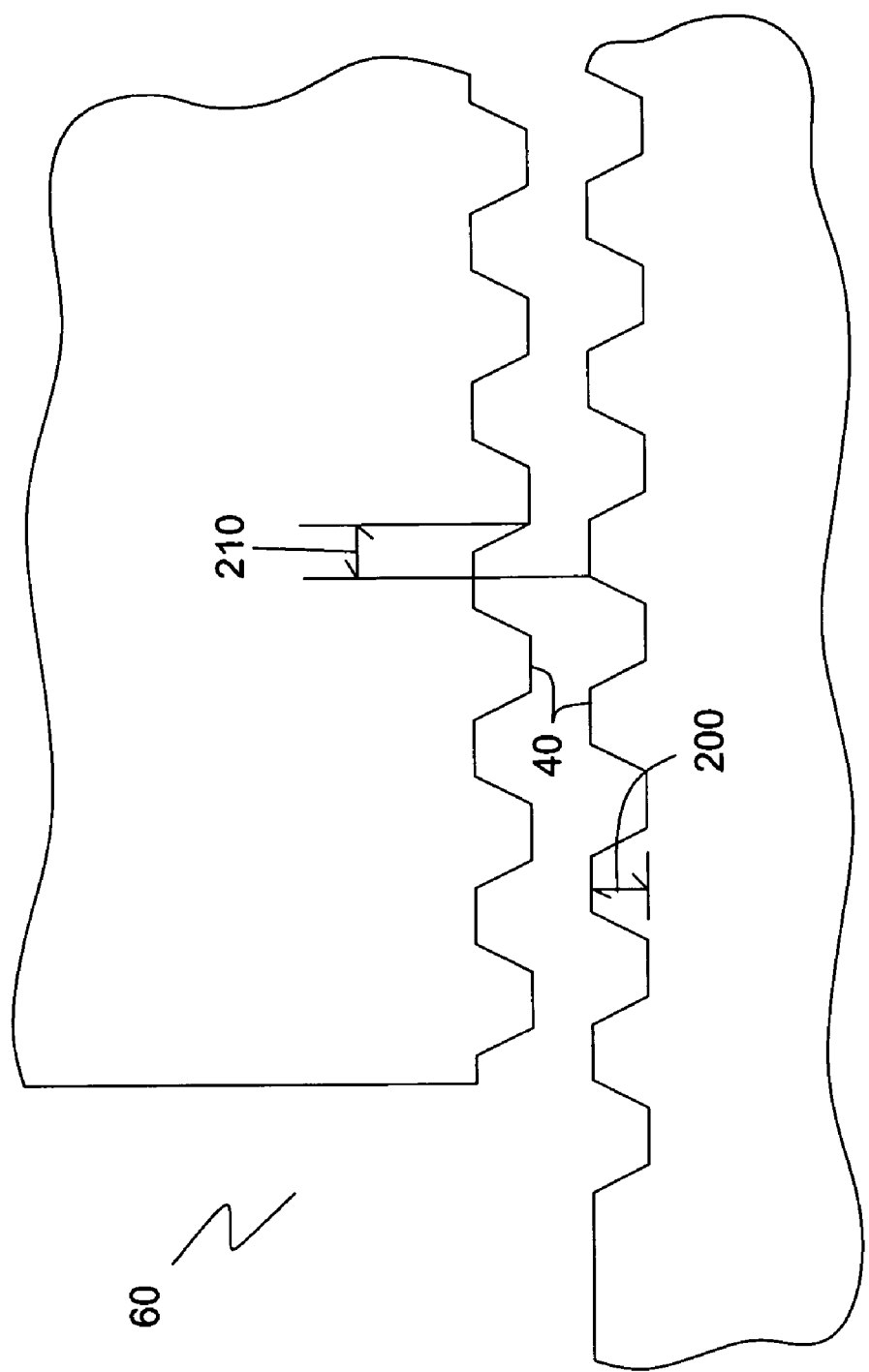
FIG. 6 is an enlarged, cross-sectional, side view of a seal having trapezoidal-shaped stages of the present invention formed into the shaft and the pole pieces showing the stages of the shaft and pole pieces in axial misalignment.

FIG. 6 is an enlarged, cross-sectional, partial side view of a multistage seal 60 having twenty trapezoidal-shaped stage pairs. The depth 200 of each tapered stage is 0.025 inch. The width of the plateau portion 40 is 0.015 inch. Axial offset is represented by reference numeral 210.

Figure 7:
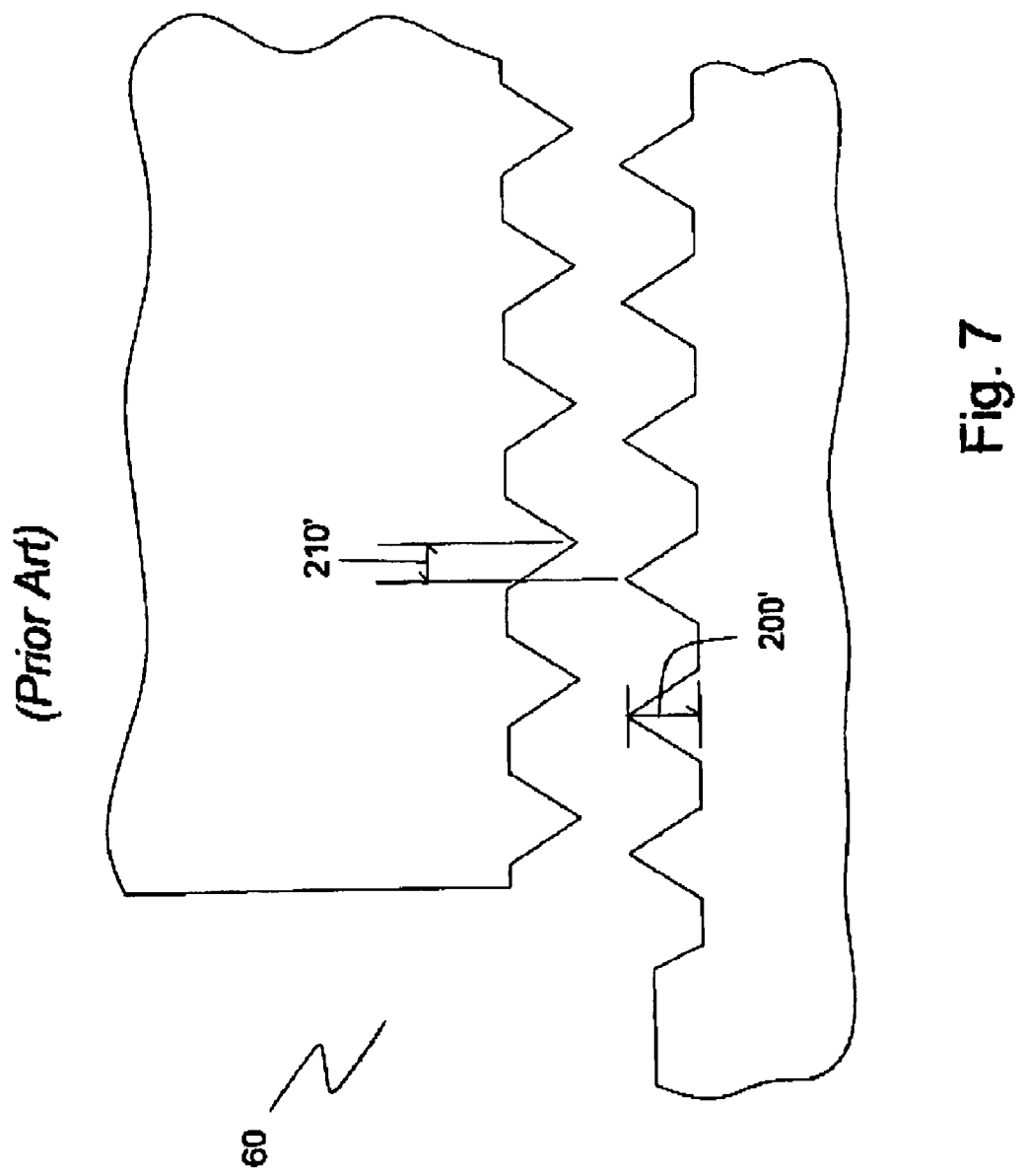
FIG. 7 is an enlarged, cross-sectional, side view of a seal having triangular-shaped stages of the prior art formed into the shaft and the pole pieces showing the stages of the shaft and pole pieces in axial misalignment.

FIG. 7 is an enlarged, cross-sectional, partial side view of a multistage seal 60 having twenty triangular-shaped stage pairs. The depth 200' of each triangular stage is 0.025 inch. Because the shape of the stage is triangular, there is no plateau portion on the stage. Axial offset for the triangular-shape pairs is represented by reference numeral 210'.

Particularly, for Table 6, the following variables were fixed.

Magnet = Neodymium Iron Boron 34  Radial Gap = 0.0056 inch
Pole Material = Stainless Steel       Shaft Material = Stainless Steel
Pole OD = 2.342 inch                  Shaft OD = 1.0 inch
Pole ID = 1.012 inch                  Shaft ID = 0.00 inch
Tooth Depth = 0.025 inch              Tooth Pitch = 0.06 inch Table 6 shows the pressure capacity comparison for a seal with 20 double stages having axial offsets of the stages between the shaft and the pole pieces in the range from 0.0 inch to 0.015 inch.

TABLE 6

Effect of Stage Shape on Pressure Capacity

| Axial Offset (Inch) | Trapezoidal Shape Pressure Capacity (PSI) | Triangular Shape Pressure Capacity (PSI) |
|---|---|---|
| 0.0 | 79.36 | 69.85 |
| 0.005 | 81.59 | 62.05 |
| 0.010 | 85.47 | 48.39 |
| 0.015 | 78.24 | 39.23 |

As can be seen from Table 6, the double trapezoidal-shaped multistage seal provides 13% more pressure capacity compared with the double triangular-shaped multistage seal at the axial concentric position with 0.0 offset. More importantly, when some axial offset exists (which is always the case in real-world seals due to part dimensional tolerances), the difference between the two stage geometries increases significantly. The pressure capacity of the double triangular-shaped stage decreases substantially, while the pressure capacity of the double trapezoidal-shaped stage maintains its value or even increases slightly when the offset is not too large.

The proffered reason for the superior performance of double trapezoidal-shaped stages is that each tooth of the individual stages has more area facing the mating tooth making it less likely to be magnetically choked. This characteristic also makes the double trapezoidal-shaped stage less sensitive to the axial offset because the effective sealing gap does not change with the offset (within certain offset limits). In comparison, the sealing gap of the double triangular-shaped stage increases significantly with the increase of axial offset.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A magnetic assembly for use in a multistage magnetic fluid rotary seal comprising:
    a shaft having a plurality of trapezoidal-shaped ridges along a circumferential portion of said shaft;
    an annular permanent magnet adapted to surround said shaft; and
    a magnetically permeable annular first pole piece having a first magnet side and a first pole piece inner diameter, said first magnet side being in a magnetic flux relationship with said magnet, said first pole piece having a plurality of pole piece trapezoidal-shaped ridges along said first pole piece inner diameter wherein a top flat portion of each of said trapezoidal-shaped ridges of said first pole piece is spatially opposed to a flat top portion of one of said plurality of trapezoidal-shaped ridges of said circumferential portion of said shaft, said top flat portion of said plurality of pole piece trapezoidal-shaped ridges being adapted to extend into a close substantially radially aligned and non-contacting relationship with said top flat portion of said plurality of trapezoidal-shaped ridges of said circumferential portion of said shaft wherein said plurality of trapezoidal-shaped ridges form a plurality of trapezoidal-shaped stages, said relationship defining a radial gap adapted to receive a predefined quantity of ferrofluid disposed in said radial gap at said plurality of trapezoidal-shaped stages.

2. The magnetic assembly of claim 1 further comprising a magnetically permeable annular second pole piece having a second magnet side and a second pole piece inner diameter, said second magnet side being in magnetic flux relationship with said magnet, said second pole piece inner diameter adapted to extend into close non-contacting relationship with said plurality of trapezoidal-shaped ridges of said circumferential portion of said shaft, said relationship defining said radial gap adapted to receive a predefined quantity of ferrofluid disposed in said radial gap at said plurality of trapezoidal-shaped stages.

3. The magnetic assembly of claim 2 wherein said second pole piece has a plurality of said trapezoidal-shaped ridges along said second pole piece inner diameter wherein each of said trapezoidal-shaped ridges of said second pole piece is spatially opposed to one of said plurality of trapezoidal-shaped ridges of said circumferential portion of said shaft.

4. The magnetic assembly of claim 1 wherein each of said trapezoidal-shaped ridges has tapered sides that diverge away from a top plateau portion to an annular region on the surface of said shaft.

5. The magnetic assembly of claim 4 wherein said tapered sides of each of said trapezoidal-shaped ridges diverge at an angle between 0 degrees and 180 degrees.

6. A method of making a multistage magnetic fluid rotary seal with increased pressure capacity, said method comprising:
    forming a plurality of trapezoidal-shaped ridges along a circumferential portion of a rotary shaft;
    assembling said shaft with an annular permanent magnet and at least a first magnetically permeable annular pole piece adapted to surround said shaft forming a magnetic circuit wherein said first pole piece has a first magnet side and a first pole piece inner diameter, said first magnet side being in a magnetic flux relationship with said magnet, said first pole piece inner diameter having a plurality of trapezoidal-shaped ridges adapted to extend into a close non-contacting relationship with said plurality of trapezoidal-shaped ridges of said circumferential portion of said shaft wherein said plurality of opposed trapezoidal-shaped ridges have top flat portions that are substantially radially aligned with each other to form a plurality of trapezoidal-shaped stages, said relationship defining a radial gap; and
    disposing a predefined quantity of a ferrofluid in said radial gap at said plurality of trapezoidal-shaped stages.

7. The method of claim 6 further comprising assembling a second magnetically permeable pole piece adapted to surround said circumferential portion of said shaft wherein said second pole piece has a second magnet side and a second pole piece inner diameter said second magnet side being in a magnetic flux relationship with said magnet, said second pole piece inner diameter adapted to extend into a close non-contacting relationship with said plurality of trapezoidal-shaped ridges of said circumferential portion of said shaft, said relationship defining said radial gap and adapted to receive a predefined quantity of ferrofluid disposed in said radial gap at said plurality of trapezoidal-shaped stages.

8. The method of claim 7 further comprising forming a plurality of said trapezoidal-shaped ridges along said second pole piece inner diameter wherein each of said trapezoidal-shaped ridges of said second pole piece is spatially opposed to one of said plurality of trapezoidal-shaped ridges of said circumferential portion of said shaft.

9. The method of claim 6 further comprising diverging tapered sides of each of said trapezoidal-shaped ridges away from a top portion to an adjacent annular region.

10. The method of claim 9 wherein said diverging step includes diverging said tapered sides at an angle between 0 degrees and 180 degrees.

11. A method of making a multistage magnetic fluid rotary seal with increased pressure capacity, said method comprising:
    forming a plurality of trapezoidal-shaped ridges along an inner circumferential diameter of a magnetically permeable annular first pole piece;
    forming a plurality of trapezoidal-shaped ridges along an outer circumferential portion of a shaft;

assembling said first pole piece with said shaft and an annular permanent magnet, said first pole piece and said magnet adapted to surround said shaft forming a magnetic assembly wherein a top flat portion of each of said trapezoidal-shaped ridges of said first pole piece is spatially opposed to a top flat portion of one of a corresponding trapezoidal ridge of said shaft and adapted to extend into a close substantially radially aligned and non-contacting relationship with said top flat portion of said plurality of trapezoidal-shaped ridges of said shaft forming a plurality of trapezoidal-shaped stages, said relationship defining a radial gap; and disposing a predefined quantity of a ferrofluid at said plurality of trapezoidal-shaped stages.

12. The method of claim 11 further comprising assembling a second magnetically permeable annular pole piece adapted to surround said shaft wherein said second pole piece has a second magnet side and a second pole piece inner diameter, said second magnet side being in a magnetic flux relationship with said magnet, said second pole piece inner diameter having a plurality of said trapezoidal-shaped ridges along said second pole piece inner diameter wherein each of said trapezoidal-shaped ridges of said second pole piece is spatially opposed to one of said plurality of trapezoidal-shaped ridges of said shaft and adapted to extend into a close non-contacting relationship with said shaft, said relationship defining said radial gap.

13. The method of claim 12 further comprising diverging tapered sides of each of said trapezoidal-shaped ridges away from a top portion to an adjacent annular region.

14. The method of claim 13 wherein said diverging step includes diverging said tapered sides at an angle between 0 degrees and 180 degrees.

15. A method of improving the pressure capacity of a multistage magnetic fluid rotary seal having a shaft, a permanent magnet, at least one pole piece wherein said shaft and said at least one pole piece each has a plurality of geometric-shaped stages, and ferrofluid disposed in a radial gap between said plurality of stages of said pole piece and said shaft, the improvement comprising:

forming said plurality of geometric-shaped stages into trapezoidal-shaped stages having a flat top portion facing said radial gap and tapered sides that diverge from said top portion.

16. A multistage ferrofluid seal comprising;

a rotary shaft having a circumferential portion with a plurality of circumferential trapezoidal-shaped ridges;

at least one pole piece having an inner diameter with a plurality of trapezoidal-shaped ridges, said at least one pole piece being disposed around said circumferential portion of said rotary shaft in a non-contacting relationship wherein each of said plurality of trapezoidal-shaped ridges of said at least one pole piece has a top flat portion that is opposed substantially radially aligned to a top flat portion of one of said plurality of circumferential trapezoidal-shaped ridges of said rotary shaft and forming a radial gap between said shaft and said inner diameter of said at least one pole piece;

an annular magnet disposed around said rotary shaft in a non-contacting relationship and adjacent said at least one pole piece;

ferrofluid disposed within said radial gap formed between said at least one pole piece and said shaft; and a housing to contain said circumferential portion of said shaft, said at least one pole piece and said annular magnet.

17. The seal of claim 16 further comprising a second pole piece having an inner diameter with a plurality of trapezoidal-shaped ridges, said second pole piece being disposed around said circumferential portion of said rotary shaft in a non-contacting relationship wherein each of said plurality of trapezoidal-shaped ridges of said second pole piece is opposed to one of said plurality of circumferential trapezoidal-shaped ridges of said rotary shaft and forming a radial gap between said shaft and said inner diameter of said second pole piece.

18. The seal of claim 16 wherein each of said trapezoidal-shaped ridges has tapered sides that diverge away from a top plateau portion to an annular region.

19. The seal of claim 18 wherein said tapered sides of each of said trapezoidal-shaped ridges diverge at an angle between 0 degrees and 180 degrees.

* * * * *